April 12, 1927.  J. W. G. FRIES  1,624,095

METER

Filed Oct. 11, 1923

J. W. G. Fries
INVENTOR by Edwin M. Hulse
ATTORNEY

Patented Apr. 12, 1927.

1,624,095

UNITED STATES PATENT OFFICE.

JALMAR W. G. FRIES, OF FORT WAYNE, INDIANA, ASSIGNOR TO S. F. BOWSER AND COMPANY, INCORPORATED, OF FORT WAYNE, INDIANA, A CORPORATION.

METER.

Application filed October 11, 1923. Serial No. 667,810.

The invention relates to fluid meters and is particularly directed to devices for metering liquids such as gasoline and other liquids that are commonly used in factories, garages and filling stations, and the like.

Wherever fluids are dispensed, as in filling stations, for example, the dispensing mechanism is usually in charge of an attendant. The presence on the pump or other dispensing device of an accurate meter which will indicate at all times the total quantity of fluid that has been dispensed is of great value and benefit to the proprietor, since it will enable him to check up the business done by the mechanism with the least possible delay and difficulty. The meter is also highly useful in connection with all dispensing mechanisms or systems however operated.

The object of the invention is to provide a device which is simple, compact and durable and which shall effectively meter fluids that are dispensed by various mechanisms.

The invention consists in the novel construction, arrangement and combination of parts, one embodiment of the same being illustrated in the accompanying drawings, in which—

Figure 2:
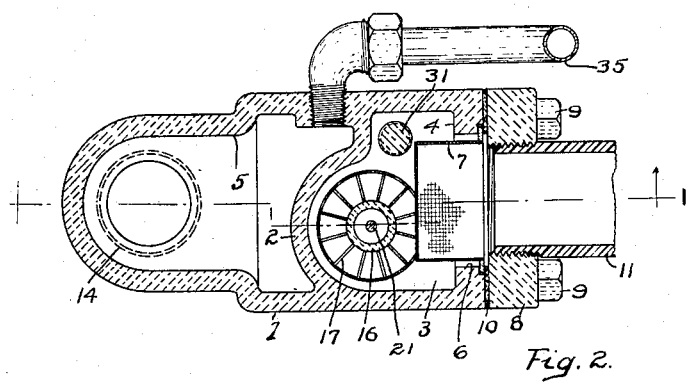
Figure 3:
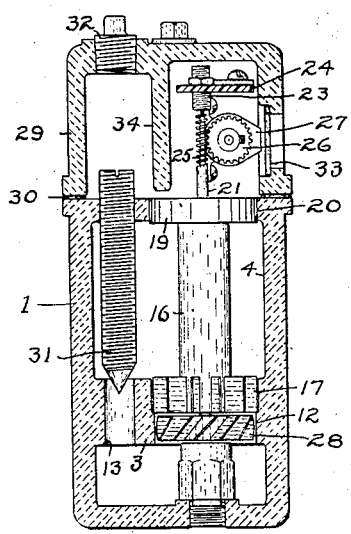
Figure 1:
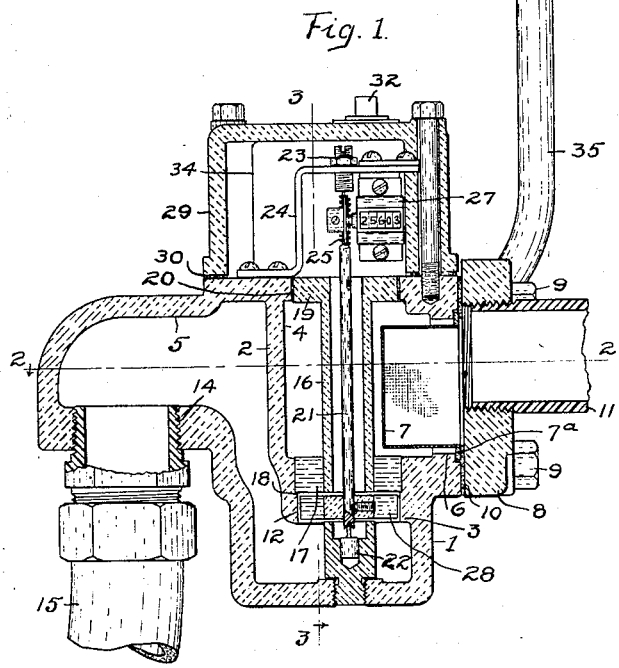

Figure 1 is a cross-sectional view of the device on line 1—1 of Fig. 2; Fig. 2 a cross-sectional view on line 2—2 of Fig. 1, and Fig. 3 a cross-sectional view on line 3—3 of Fig. 1.

In the drawings, the casing 1 is divided by the partitions 2 and 3 into two compartments 4 and 5 which, for clearness, are described herein as the intake and discharge compartments respectively. A port 6 is formed in a wall of the compartment 4, and a screen 7 having an annular flange 7ª is secured in the port by an apertured plate 8 that is secured to the casing by the bolts 9, a gasket 10 being disposed between the opposing faces of the plate and the casing and the flange 7ª on the screen being clamped between the plate and a shoulder formed at the outer orifice of the port. A pipe 11 is threaded into the plate and forms a conductor for the fluid to be metered, the pipe leading from any source of supply, such as a pump mechanism. The screen 7 removes foreign particles, such as dirt, lint and the like from the fluid so that the mechanism within the casing will not be clogged or prevented from operation.

Communication between the two compartments is formed by two ports 12 and 13 in the partition 3 and a discharge port 14 is formed in a wall of the compartment 5 to which is connected a discharge conduit 15, such as a hose or pipe that leads to or may be directed to the container that is intended to receive the fluid. As shown in the drawings, the compartment 5 extends below as well as about one side of the compartment 4, and the port 14 is formed in a wall of the compartment 5 so that it will cooperate with the intake port 6 to cause a normal level of the fluid to be maintained in both compartments so as to ensure the submergence continuously of the turbine member, about to be described.

A sleeve 16 carrying at its lower end a series of blades 17 is supported on a seat 18 formed in the wall of the port 12, the blades preferably radiating from the sleeve in perpendicular planes. A flange 19 is formed at the upper end of the sleeve and fits within an opening 20 formed in the top wall of the casing 1.

A shaft 21 is projected through the sleeve and it is revolubly supported at its lower end in a bearing 22 formed or secured to the bottom wall of the casing, the upper end of the shaft being engaged in a bearing 23 that is adjustably mounted in a bracket 24 secured to the top of the casing. A worm 25 is formed on the shaft adjacent to its upper end and meshes with a gear 26 that is operatively connected to a suitable registering mechanism 27 that is adjustably supported upon the casing 1 in any convenient manner as by the bracket 24. A turbine element 28 is secured to the shaft immediately below the directing blades 17 and, preferably, it is disposed in the port 12 for rotation by the fluid that flows through the port, the blades 17 directing the fluid upon the blades of the turbine in a vertical direction.

A housing or cover 29 is removably secured to the top of the casing 1 and encloses the registering mechanism 27, a gasket 30 being disposed between the opposing faces of the casing and the housing to produce a fluid tight joint between them, and thereby form an air-pocket in the housing that will prevent the fluid from passing from the compartments into the housing.

A needle valve 31 is threaded through the top wall of the casing and is adapted to control the auxiliary port 13. The upper end of the valve being accessible through an opening in the housing that is normally closed by a plug 32. The auxiliary port forms a by-pass between the two compartments by which any inaccuracy in the indication of the quantity of fluid discharged may be corrected. When the device is assembled the needle valve will be opened sufficiently to permit a selected quantity of the fluid to flow through the port 13 and the registering mechanism and the turbine shaft will be adjusted so that the mechanism will record the exact quantity of fluid that is discharged through the conduit 15. Thereafter if upon a test it shall be found that the mechanism is recording more fluid than is discharged the needle valve will be opened sufficiently to cause the deficient quantity to flow through the by-pass and if the mechanism registers less than the quantity delivered the needle will be closed more or less to restrict the flow through the auxiliary port. In this manner the registering mechanism may be caused to record accurately the fluid that is discharged through the conduit 15.

The housing 29 is normally sealed on the casing against unauthorized removal, the dials of the registering mechanism being visible through a transparency 33 mounted in the housing. A partition 34 in the housing prevents access, through the opening normally closed by the plug 32, to the registering mechanism. The plug will also be suitably sealed against unauthorized removal.

In order that the fluid will flow through the casing when the discharge conduit has been opened, a vent pipe 35 is connected to the casing for communication with the compartment 5. The vent also permits the discharge conduit to drain after an operation, where such drainage is desirable or essential.

When the discharge conduit has been opened and fluid is flowing into the casing the major portion of the fluid is directed by the blades 17 in a vertical direction upon the blades of the turbine member. The turbine is thereby caused to rotate and through the shaft cause the registering mechanism to operate, the total quantity of fluid discharged through the device being indicated by the mechanism at all times.

In the event the screen 7 should become clogged with foreign matter the bolts 9 are removed, whereupon the casing and the plate 8 are readily separated and the screen removed and cleaned.

What I claim is:

1. Fluid metering apparatus comprising a casing having inlet and outlet ports for fluid to be metered, means dividing the casing into two compartments and having a port therein to form a communication between said compartments through which the fluid flows in its passage from the inlet to the outlet port, a metering mechanism mounted on the casing, a turbine member mounted in the communicating port, a shaft connected to the turbine member and adapted to drive the metering mechanism, and a sleeve carrying fluid directing blades disposed in the port above the turbine, said sleeve being adapted to prevent contact of the fluid with the shaft and with the metering mechanism.

2. Fluid metering apparatus comprising a casing having inlet and outlet ports for fluid to be metered, means dividing the casing into two compartments and having a port therein to form a communication between said compartments through which the fluid flows in its passage from the inlet to the outlet ports, a by-pass between the two compartments, means to control the by-pass, a metering mechanism mounted on the casing, a turbine member mounted in the communicating port, a shaft connected to the turbine member and adapted to drive the metering mechanism, and a sleeve carrying fluid directing blades disposed in the port above the turbine, said sleeve being adapted to prevent contact of the fluid with the shaft and with the metering mechanism.

3. Fluid metering apparatus comprising a casing, partition means within the casing dividing the same into two compartments, a fluid supply conduit having communication with one of said compartments, a discharge conduit having communication with the other of said compartments at a point such that a normal level of fluid is maintained in the casing, the partition means having a passageway therein to form a communication between the compartments, said passageway being below said normal level of fluid, a turbine member rotatably mounted in said passageway, a registering mechanism adapted to be driven by the turbine member, a housing enclosing the registering mechanism and detachably secured to the casing in fluid tight manner, means to vent the casing, a by-pass between the two compartments and means to control the by-pass and accessible through the housing.

In witness whereof I have hereunto subscribed my name this 8th day of October, 1923.

JALMAR W. G. FRIES.